United States Patent
Stiebinger et al.

(10) Patent No.: US 11,499,497 B1
(45) Date of Patent: Nov. 15, 2022

(54) ENGINE ASSEMBLY HAVING A TURBOCHARGER

(71) Applicant: BRP-ROTAX GMBH & CO. KG, Gunskirchen (AT)

(72) Inventors: Christian Stiebinger, Buchkirchen (AT); Christian Sulek, St. Florian (AT); Tomas Andor, Hepberg (DE)

(73) Assignee: BRP-ROTAX GMBH & CO. KG, Gunskirchen (AT)

(*) Notice: Subject to any disclaimer, the term of this patent is extended or adjusted under 35 U.S.C. 154(b) by 0 days.

(21) Appl. No.: 17/163,917

(22) Filed: Feb. 1, 2021

Related U.S. Application Data

(60) Provisional application No. 62/968,397, filed on Jan. 31, 2020.

(51) Int. Cl.
| | |
|---|---|
| F02D 43/04 | (2006.01) |
| F02D 41/04 | (2006.01) |
| F02D 41/30 | (2006.01) |
| F02D 41/18 | (2006.01) |
| F02P 5/04 | (2006.01) |
| F02D 41/00 | (2006.01) |

(52) U.S. Cl.
CPC ......... *F02D 43/04* (2013.01); *F02D 41/0087* (2013.01); *F02D 41/045* (2013.01); *F02D 41/182* (2013.01); *F02D 41/30* (2013.01); *F02P 5/04* (2013.01); *F02D 2041/0012* (2013.01); *F02D 2200/101* (2013.01); *F02D 2200/50* (2013.01)

(58) Field of Classification Search
CPC .............. F02D 43/04; F02D 2200/101; F02D 2200/50; F02D 2041/0012; F02D 41/0087; F02D 41/045; F02D 41/182; F02D 41/30; F02P 5/04
See application file for complete search history.

(56) References Cited

U.S. PATENT DOCUMENTS

| | | | | |
|---|---|---|---|---|
| 2016/0032845 | A1* | 2/2016 | Boyer | F02B 37/025 |
| | | | | 60/605.1 |
| 2016/0215705 | A1* | 7/2016 | Haizaki | F02P 5/1504 |
| 2016/0237920 | A1* | 8/2016 | Higashio | F02P 5/045 |
| 2017/0356366 | A1* | 12/2017 | Glugla | F02D 17/02 |
| 2017/0356370 | A1* | 12/2017 | Doering | F02D 13/04 |
| 2017/0356375 | A1* | 12/2017 | Glugla | B60W 10/06 |
| 2018/0149100 | A1* | 5/2018 | Shin | F02D 17/02 |
| 2018/0347435 | A1* | 12/2018 | Daniels | F02P 5/1512 |

* cited by examiner

*Primary Examiner* — George C Jin
(74) *Attorney, Agent, or Firm* — BCF LLP

(57) ABSTRACT

An engine assembly for a vehicle includes an engine and a turbocharger operatively connected thereto. A controller is configured to, based on at least one performance parameter associated with the vehicle, execute a pre-acceleration control sequence including: delaying ignition within the engine's cylinders to increase a temperature of exhaust gas discharged to the turbocharger and reduce a torque of the engine; deactivating at least one cylinder in a predetermined pattern to reduce the torque of the engine; actuating a throttle valve to increase air flow to the engine to (i) increase the torque of the engine, and (ii) increase a volume of exhaust gas discharged to the turbocharger; and increasing a volume of fuel injected by the fuel injectors into the cylinders so as to increase the torque of the engine thereby compensating at least in part reduction of the torque of the engine.

18 Claims, 10 Drawing Sheets

CONTROLLING THE VALVE 230 TO DIRECT A MAJORITY OF EXHAUST GAS DISCHARGED BY THE ENGINE THROUGH THE EXHAUST TURBINE OF THE TURBOCHARGER
1005

DELAYING IGNITION WITHIN THE CYLINDERS BY THE SPARK PLUGS SO AS TO INCREASE A TEMPERATURE OF EXHAUST GAS DISCHARGED BY THE ENGINE TO THE EXHAUST TURBINE OF THE TURBOCHARGER AND REDUCE A TORQUE OF THE ENGINE
1010

DEACTIVATING AT LEAST ONE CYLINDER IN A PREDETERMINED PATTERN BY DISABLING AT LEAST ONE OF (i) AT LEAST ONE FUEL INJECTOR AND (ii) AT LEAST ONE SPARK PLUG CORRESPONDING TO THE AT LEAST ONE CYLINDER, SO AS TO REDUCE THE TORQUE OF THE ENGINE
1020

ACTUATING THE THROTTLE VALVE TO INCREASE AIR FLOW TO THE ENGINE SO AS TO (i) INCREASE THE TORQUE OF THE ENGINE THEREBY COMPENSATING AT LEAST IN PART REDUCTION OF THE TORQUE OF THE ENGINE CAUSED BY DELAYING IGNITION WITHIN THE CYLINDERS AND DEACTIVATING THE AT LEAST ONE CYLINDER, AND (ii) INCREASE A VOLUME OF EXHAUST GAS DISCHARGED TO THE EXHAUST TURBINE OF THE TURBOCHARGER
1030

INCREASING A VOLUME OF FUEL INJECTED BY THE FUEL INJECTORS INTO THE CYLINDERS OTHER THAN THE AT LEAST ONE CYLINDER SO AS TO INCREASE THE TORQUE OF THE ENGINE THEREBY COMPENSATING AT LEAST IN PART REDUCTION OF THE TORQUE OF THE ENGINE CAUSED BY DELAYING IGNITION WITHIN THE CYLINDERS AND DEACTIVATING THE AT LEAST ONE CYLINDER
1040

FIG. 8

ENGINE ASSEMBLY HAVING A TURBOCHARGER

CROSS-REFERENCE

The present application claims priority from U.S. Provisional Patent Application No. 62/968,397, filed Jan. 31, 2020, the entirety of which is incorporated by reference herein.

FIELD OF THE TECHNOLOGY

The present technology relates to engine assemblies including a turbocharger.

BACKGROUND

For internal combustion engines, such as those used in off-road vehicles such as a side-by-side vehicle (SSV), the efficiency of the combustion process can be increased by compressing the air entering the engine. This can be accomplished using a turbocharger connected to the air intake and exhaust systems associated with the engine. The turbocharger is spooled by exhaust gas discharged by the engine so as to compress air that is delivered into the air intake of the engine.

However, turbocharged engines are subject to what is commonly referred to as "turbo lag", which is a delay between the time a driver of the vehicle actuates a throttle operator (e.g., an accelerator pedal) to the time the desired engine output is reached. This delay is due to the time it takes to spool the turbocharger sufficiently to compress and pump air into the engine. Moreover, turbo lag is typically greatest when the engine is accelerated from low engine speed.

While various solutions have been proposed to reduce turbo lag, such as variable-geometry turbochargers or twin-scroll turbochargers, these can be expensive to implement or do not reduce turbo lag sufficiently. Moreover, in some cases, it has been known to direct some amount of unburnt air/fuel mixture from the engine into the exhaust manifold where it can combust to spool the turbocharger and thus reduce the turbo lag. However, this can generate a significant amount of noxious emissions which is not suitable for vehicles such as SSVs.

There is thus a need for an engine assembly including a turbocharger that addresses at least some of these drawbacks.

SUMMARY

It is an object of the present technology to ameliorate at least some of the inconveniences present in the prior art.

According to one aspect of the present technology, there is provided an engine assembly for a vehicle. The engine assembly includes an internal combustion engine including: a crankcase; a crankshaft disposed at least in part in the crankcase; a cylinder block connected to the crankcase; a plurality of cylinders defined in the cylinder block; a plurality of pistons operatively connected to the crankshaft, each piston of the plurality of pistons being movably disposed within a corresponding cylinder of the plurality of cylinders; a plurality of spark plugs connected to the plurality of cylinders, each spark plug of the plurality of spark plugs being configured to produce a spark to ignite an air-fuel mixture in a corresponding cylinder of the plurality of cylinders; and a plurality of fuel injectors for injecting fuel into the plurality of cylinders. The engine also includes a throttle body in fluid communication with the engine; a throttle valve for regulating air flowing through the throttle body into the engine; a turbocharger operatively connected to the engine, the turbocharger comprising a compressor and an exhaust turbine; and a controller operable to control the spark plugs, the fuel injectors and the throttle valve, the controller being configured to, based on at least one performance parameter associated with the vehicle, execute a pre-acceleration control sequence. The pre-acceleration control sequence includes: delaying ignition within the cylinders by the spark plugs so as to increase a temperature of exhaust gas discharged by the engine to the exhaust turbine of the turbocharger and reduce a torque of the engine; deactivating at least one cylinder of the plurality of cylinders in a predetermined pattern by disabling at least one of (i) at least one fuel injector of the plurality of fuel injectors and (ii) at least one spark plug of the plurality of spark plugs corresponding to the at least one cylinder, so as to reduce the torque of the engine; actuating the throttle valve to increase air flow to the engine so as to (i) increase the torque of the engine thereby compensating at least in part reduction of the torque of the engine caused by delaying ignition within the cylinders and deactivating the at least one cylinder, and (ii) increase a volume of exhaust gas discharged to the exhaust turbine of the turbocharger; and increasing a volume of fuel injected by the fuel injectors into the cylinders other than the at least one cylinder so as to increase the torque of the engine thereby compensating at least in part reduction of the torque of the engine caused by delaying ignition within the cylinders and deactivating the at least one cylinder.

In some embodiments, the pre-acceleration control sequence is executed by the controller in response to the controller operating in a pre-acceleration performance mode that is selectively activated.

In some embodiments, the pre-acceleration performance mode is automatically activated.

In some embodiments, the pre-acceleration performance mode is activated by a user.

In some embodiments, the at least one cylinder deactivated by the controller includes a different cylinder of the plurality of cylinders for each consecutive rotation of the crankshaft of the engine.

In some embodiments, the at least one cylinder deactivated by the controller includes two cylinders per rotation of the crankshaft of the engine.

In some embodiments, the at least one performance parameter associated with the vehicle includes a speed of the engine and a load demand parameter of the engine.

In some embodiments, the controller executes steps of the pre-acceleration control sequence based on at least one predetermined engine load demand threshold that varies as a function of the speed of the engine.

In some embodiments, the at least one predetermined engine load demand threshold includes a first predetermined engine load demand threshold; and in response to the load demand parameter of the engine at a given speed of the engine being less than the first predetermined engine load demand threshold for the given speed of the engine, the controller delays ignition within the cylinders by the spark plugs.

In some embodiments, the at least one predetermined engine load demand threshold includes a second predetermined engine load demand threshold, the second predetermined engine load demand threshold being lower than the first predetermined engine load demand threshold for any given speed of the engine; and in response to the load demand parameter of the engine at the given speed of the engine being less than the second predetermined engine load demand threshold for the given speed of the engine, the controller deactivates the at least one cylinder of the plurality of cylinders.

In some embodiments, the at least one predetermined engine load demand threshold includes a third predetermined engine load demand threshold, the third predetermined engine load demand threshold being lower than the second predetermined engine load demand threshold for any given speed of the engine; the at least one cylinder of the plurality of cylinders includes a first cylinder and a second cylinder; in response to the load demand parameter of the engine at the given speed of the engine being less than the second predetermined engine load demand threshold for the given speed of the engine, the controller deactivates the first cylinder; and in response to the load demand parameter of the engine at the given speed of the engine being less than the third predetermined engine load demand threshold for the given speed of the engine, the controller deactivates the second cylinder.

In some embodiments, the engine assembly also includes a conduit having a bypass portion for directing flow of exhaust gas to bypass the turbocharger and a turbocharger portion for directing flow of exhaust gas to pass through the exhaust turbine; the conduit includes a valve for selectively diverting exhaust gas away from the exhaust turbine, the controller being operable to control the valve; the at least one predetermined engine load demand threshold includes a second predetermined engine load demand threshold, the second predetermined engine load demand threshold being greater than the first predetermined engine load demand threshold for any given speed of the engine; and in response to the load demand parameter of the engine at the given speed of the engine being less than the second predetermined engine load demand threshold for the given speed of the engine, the controller controls the valve so as to direct at least a majority of exhaust gas discharged by the engine through the turbocharger portion of the conduit to pass through the exhaust turbine of the turbocharger.

In some embodiments, the load demand parameter of the engine is one of: the torque of the engine; a position of the throttle valve; and a position of a throttle operator of the vehicle operable by a driver thereof, the throttle operator being configured to be operatively connected to the throttle valve.

In some embodiments, the at least one cylinder of the plurality of cylinders is deactivated by the controller by disabling the at least one fuel injector corresponding to the at least one cylinder.

In some embodiments, the predetermined pattern includes alternatingly: deactivating a different cylinder of the plurality of cylinders for a number of consecutive rotations of the crankshaft of the engine, the number of consecutive rotations of the crankshaft of the engine being equal to a number of the cylinders of the engine; and activating all of the cylinders for one rotation of the crankshaft of the engine.

In some embodiments, the plurality of cylinders includes at least three cylinders; and the predetermined pattern comprises alternatingly: deactivating two cylinders of the plurality of cylinders for a number of consecutive rotations of the crankshaft of the engine, the number of consecutive rotations of the crankshaft of the engine being equal to a number of the cylinders of the engine; and activating all of the cylinders for one rotation of the crankshaft of the engine.

In some embodiments, the predetermined pattern includes alternatingly: deactivating all of the cylinders for one rotation of the crankshaft of the engine; and activating all of the cylinders for at least one rotation of the crankshaft of the engine.

In some embodiments, when the controller deactivates the at least one cylinder, air flow through the at least one cylinder is maintained.

In some embodiments, the pre-acceleration control sequence is executed in response to the throttle valve being open below a predetermined threshold level.

In some embodiments, a vehicle includes the engine assembly.

According to another aspect of the present technology, there is provided a method for controlling an internal combustion engine for a vehicle, the engine being operatively connected to a turbocharger, the engine including a plurality of cylinders defined in a cylinder block of the engine. The method includes: determining at least one performance parameter associated with the vehicle; in response to the at least one performance parameter associated with the vehicle being lower than a predetermined threshold value thereof: delaying ignition within the cylinders by a plurality of spark plugs connected to the plurality of cylinders so as to increase a temperature of exhaust gas discharged by the engine to an exhaust turbine of the turbocharger and reduce a torque of the engine; deactivating at least one cylinder of the plurality of cylinders in a predetermined pattern by disabling at least one of (i) at least one fuel injector of a plurality of fuel injectors and (ii) at least one spark plug of the plurality of spark plugs corresponding to the at least one cylinder, so as to reduce the torque of the engine; actuating a throttle valve disposed in a throttle body in fluid communication with the engine to increase air flow to the engine so as to (i) increase the torque of the engine thereby compensating at least in part reduction of the torque of the engine caused by delaying ignition with the cylinders and deactivating the at least one cylinder, and (ii) increase a volume of exhaust gas discharged to the exhaust turbine of the turbocharger; and increasing a volume of fuel injected by the fuel injectors into the cylinders other than the at least one cylinder so as to increase the torque of the engine thereby compensating at least in part reduction of the torque of the engine caused by delaying ignition within the cylinders and deactivating the at least one cylinder.

In some embodiments, the method also includes prior to determining the at least one performance parameter associated with the vehicle, receiving a signal representative of a request to begin a pre-acceleration control sequence.

In some embodiments, the at least one deactivated cylinder includes a different cylinder of the plurality of cylinders for each consecutive rotation of a crankshaft of the engine.

In some embodiments, the at least one deactivated cylinder includes two cylinders per rotation of the crankshaft of the engine.

In some embodiments, the at least one performance parameter associated with the vehicle includes a speed of the engine and a load demand parameter of the engine.

In some embodiments, delaying ignition within the cylinders is effected in response to the load demand parameter of the engine at a given speed of the engine being less than a first predetermined engine load demand threshold for the given speed of the engine; and the first predetermined engine load demand threshold varies as a function of the speed of the engine.

In some embodiments, deactivating the at least one cylinder of the plurality of cylinders is effected in response to the load demand parameter of the engine for the given speed of the engine being less than a second predetermined engine load demand threshold for the given speed of the engine; the second predetermined engine load demand threshold varies as a function of the speed of the engine; and the second predetermined engine load demand threshold is lower than the first predetermined engine load demand threshold for any given speed of the engine.

In some embodiments, deactivating the at least one cylinder of the plurality of cylinders in the predetermined pattern includes: deactivating first and second selected cylinders of the plurality of cylinders in the predetermined pattern in response to the load demand parameter of the engine at the given speed of the engine being less than a third predetermined engine load demand threshold for the given speed of the engine, the third predetermined engine load demand threshold varying as a function of the speed of the engine, the third predetermined engine load demand threshold being lower than the second predetermined engine load demand threshold for any given speed of the engine.

In some embodiments, the engine is in fluid communication with a conduit having a bypass portion for directing flow of exhaust gas to bypass the turbocharger and a turbocharger portion for directing flow of exhaust gas to pass through the exhaust turbine of the turbocharger; and the method also includes: controlling a valve of the conduit so as to direct at least a majority of exhaust gas discharged by the engine to pass through the exhaust turbine of the turbocharger in response to the load demand parameter of the engine at the given speed of the engine being less than a second predetermined engine load demand threshold for the given speed of the engine, the second predetermined engine load demand threshold varying as a function of the speed of the engine, the second predetermined engine load demand threshold being greater than the first predetermined engine load demand threshold for any given speed of the engine.

In some embodiments, the load demand parameter of the engine is one of: the torque of the engine; a position of the throttle valve; and a position of a throttle operator of the vehicle operable by a driver thereof, the throttle operator being configured to be operatively connected to the throttle valve.

In some embodiments, deactivating the at least one cylinder comprises disabling the at least one fuel injector corresponding to the at least one cylinder.

In some embodiments, the predetermined pattern includes alternatingly: deactivating a different cylinder of the plurality of cylinders for a number of consecutive rotations of a crankshaft of the engine, the number of consecutive rotations of the crankshaft of the engine being equal to a number of the cylinders of the engine; and activating all of the cylinders for one rotation of the crankshaft of the engine.

In some embodiments, the plurality of cylinders includes at least three cylinders; the predetermined pattern includes alternatingly: deactivating two cylinders of the plurality of cylinders for a number of consecutive rotations of a crankshaft of the engine, the number of consecutive rotations of the crankshaft of the engine being equal to a number of the cylinders of the engine; and activating all of the cylinders for one rotation of the crankshaft of the engine.

In some embodiments, the predetermined pattern includes alternatingly: deactivating all of the cylinders for one rotation of the crankshaft of the engine; and activating all of the cylinders for at least one rotation of the crankshaft of the engine.

In some embodiments, when the at least one cylinder is deactivated, air flow through the at least one cylinder is maintained.

For purposes of this application, terms related to spatial orientation such as forwardly, rearward, upwardly, downwardly, left, and right, are as they would normally be understood by a driver of the SSV sitting thereon in a normal riding position. Terms related to spatial orientation when describing or referring to components or sub-assemblies of the SSV, separately from the SSV, such as a heat exchanger for example, should be understood as they would be understood when these components or sub-assemblies are mounted to the SSV, unless specified otherwise in this application.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 8 is a flow diagram of a pre-acceleration control sequence executed by a controller of the control system of FIG. 7;

It should be noted that the Figures may not be drawn to scale, except where otherwise noted.

DETAILED DESCRIPTION

The present technology will be described with respect to a four-wheel off-road vehicle 10 having two side-by-side seats and a steering wheel (i.e., a side-by-side vehicle (SSV)). However, it is contemplated that some aspects of the present technology may apply to other types of vehicles such as, but not limited to, off-road vehicles having a handlebar and a straddle seat (i.e. an all-terrain vehicle (ATV)), vehicles having more or less than four wheels, as well as vehicles having ground-engaging members other than wheels (e.g., tracks).

Figure 1:
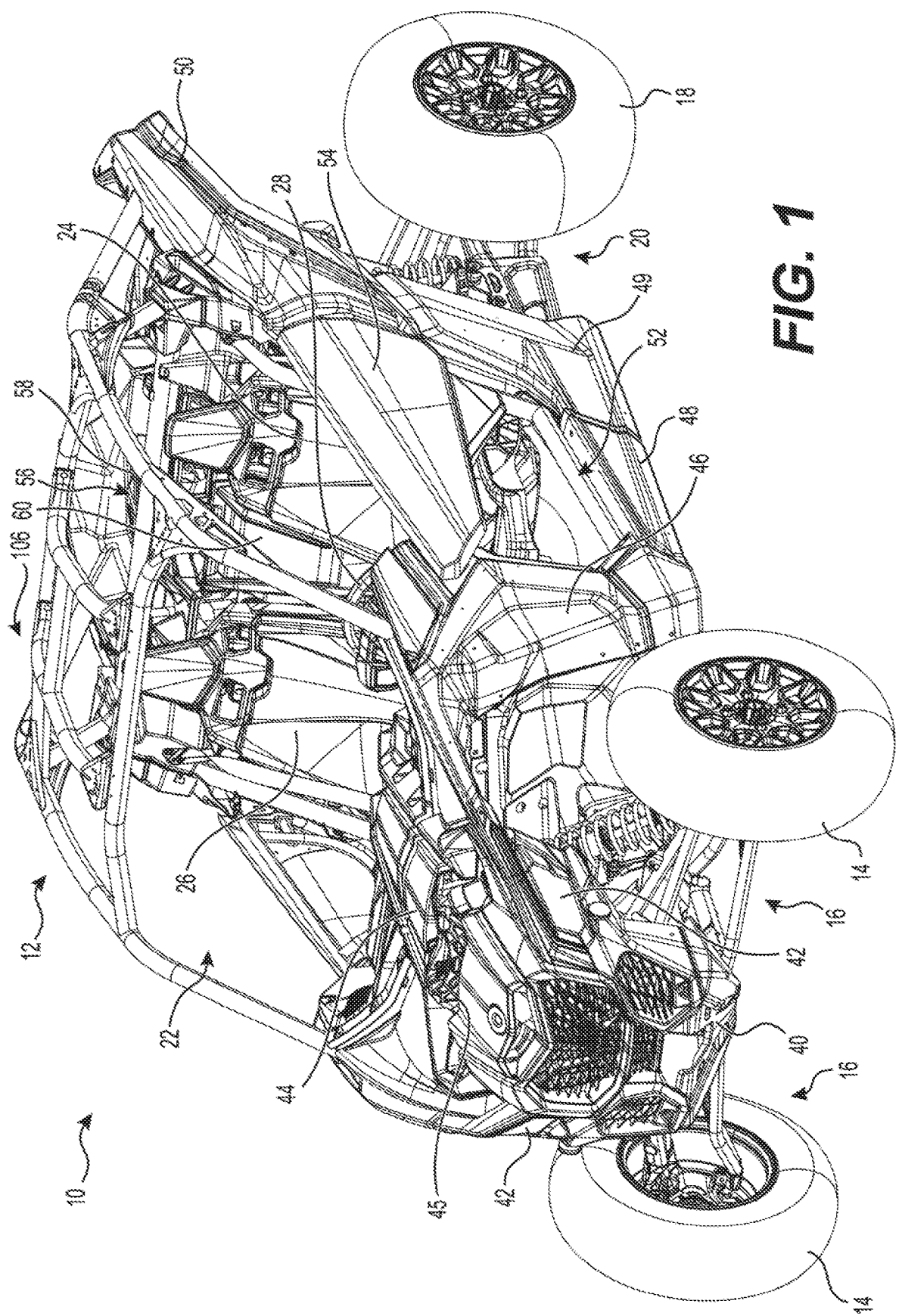
FIG. 1 is a perspective view, taken from a front, left side, of a side-by-side vehicle.

The general features of the off-road vehicle 10 will be described with respect to FIGS. 1 and 2. The vehicle 10 has a frame 12, two front wheels 14 connected to a front of the frame 12 by front suspension assemblies 16 and two rear wheels 18 connected to the frame 12 by rear suspension assemblies 20 (one of which is shown in FIG. 1). The frame 12 has a front portion, a central portion including a roll cage 106, and a rear portion.

The central portion of the frame 12 defines a central cockpit area 22 inside which are disposed a driver seat 24 and a passenger seat 26. In this embodiment, the driver seat 24 is disposed on the left side of the vehicle 10 and the passenger seat 26 is disposed on the right side of the vehicle 10. However, it is contemplated that the driver seat 24 could be disposed on the right side of the vehicle 10 and that the passenger seat 26 could be disposed on the left side of the vehicle 10. A user-operated steering input device 28 is disposed in front of the driver seat 24. In this embodiment, the user-operated steering input device 28 is a steering wheel. The steering wheel 28 is used to turn the front wheels 14 to steer the vehicle 10. As shown in FIG. 2, various displays and gauges 29 are disposed above the steering wheel 28 to provide information to the driver regarding the operating conditions of the vehicle 10. Examples of displays and gauges 29 include, but are not limited to, a speedometer, a tachometer, a fuel gauge, a transmission position display, and an oil temperature gauge. As shown schematically in FIG. 2, a throttle operator 129 is also located in the central cockpit area 22 and operable by the driver of the vehicle 10 to operate an engine thereof. In this embodiment, the throttle operator 129 is a pedal.

Figure 2:
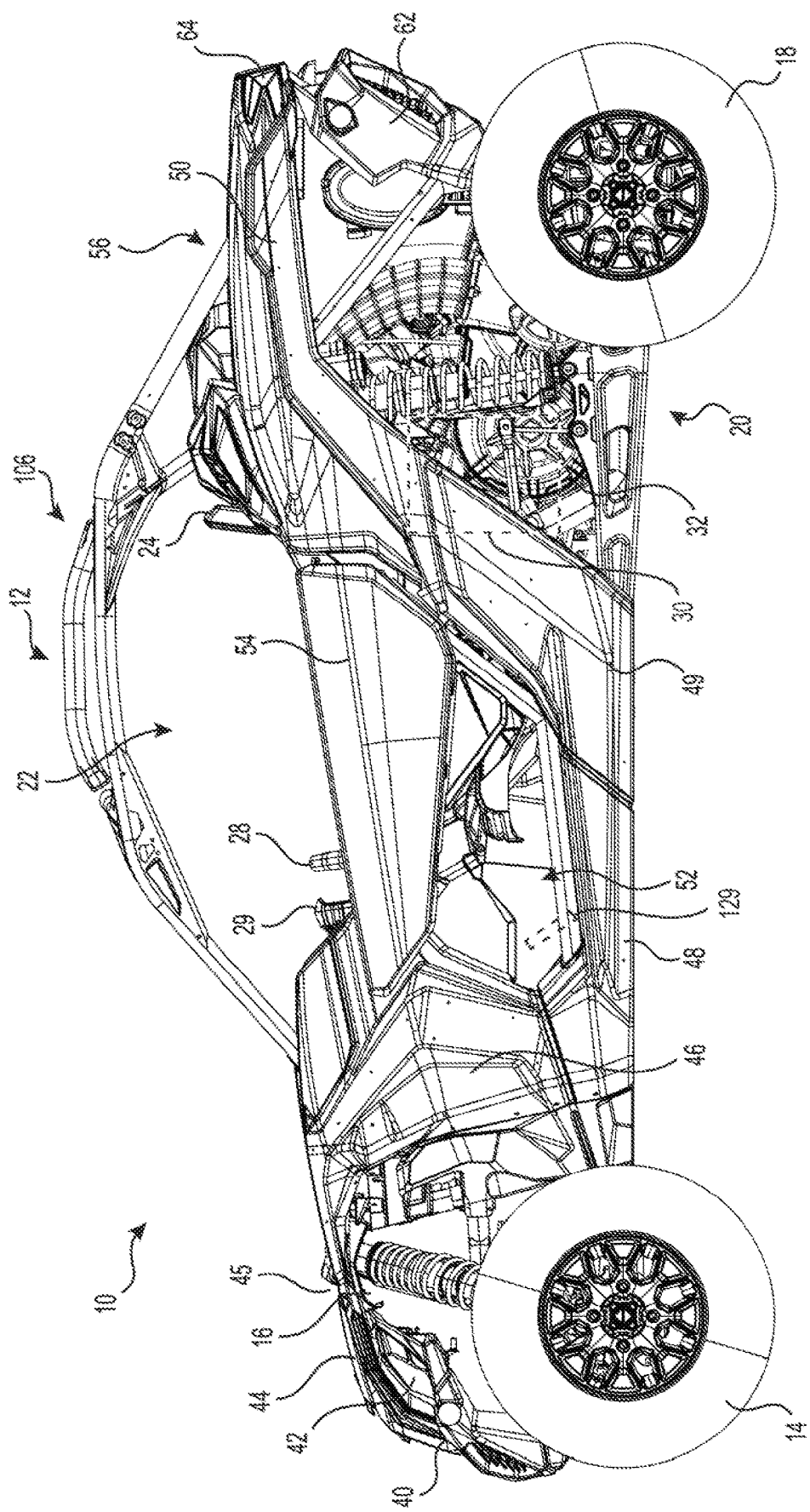
FIG. 2 is a left side elevation view of the vehicle of FIG. 1.

As shown schematically in FIG. 2, an engine 30 is connected to and supported by the rear portion of the frame 12. As will be described in more detail below, the engine 30 is part of an engine assembly 125, including a turbocharger 150 and an air intake manifold 200. The engine 30 is connected to a continuously variable transmission (CVT) 32 disposed on a left side of the engine 30. The CVT 32 is operatively connected to a transaxle (not shown) to transmit torque from the engine 30 to the transaxle. The transaxle is disposed behind the engine 30. The transaxle is operatively connected to the front and rear wheels 14, 18 to propel the vehicle 10. The engine 30, the CVT 32 and the transaxle are supported by the rear portion of the frame 12. A fuel tank (not shown) is suspended from the frame 12 in front of the driver seat 26. The fuel tank is disposed above the floor of the cockpit area 22 to the right of a longitudinal centerline of the vehicle 10.

In this embodiment, as will be described in more detail below, the engine 30 operates on a four-stroke engine cycle such that the engine 30 completes a power cycle with four strokes of the engine's pistons. The engine 30 can thus be referred to as a four-stroke engine. Nevertheless, it is contemplated that the engine 30 could be a two-stroke engine in other embodiments.

The vehicle 10 also includes various body panels that are connected to the frame 12 to help protect the internal components of the vehicle 10 and provide some of the aesthetic features of the vehicle 10. For instance, front panels 40 are connected to a front of the frame 12. The front panels 40 are disposed forward of the front suspension assemblies 16 and laterally between the front wheels 14. The front panels 40 define two apertures inside which the headlights 42 of the vehicle 10 are disposed. A cover 44 extends generally horizontally rearward from a top of the front panels 40. The cover 44 defines an aperture 45 through which tops of the front suspension assemblies 16 protrude.

Front fenders 46 are disposed rearward of the front panels 40 on each side of the vehicle 10. Each front fender 46 is disposed in part above and in part behind of its corresponding front wheel 14. Lower panels 48 extend along the bottom of the frame 12 between the front and rear wheels 14, 18. A generally L-shaped panel 49 is disposed behind the rear end of each lower panel 48. Generally L-shaped rear fenders 50 extend upward and then rearward from the rear, upper ends of the L-shaped panels 49. Each rear fender 50 is disposed in part above and in part forward of its corresponding rear wheel 18. The rear fenders 50 define apertures at the rear thereof to receive the brake lights 64 of the vehicle 10 (see FIG. 2). It is contemplated that the brake lights 64 could be replaced with reflectors or that reflectors could be provided in addition to the brake lights 64.

On each side of the vehicle 10, the front fender 46, the lower panel 48, the L-shaped panel 49 and the rear fender 50 define a passage 52 through which a driver (or passenger depending on the side of the vehicle 10) can enter or exit the vehicle 10. Each side of the vehicle 10 is provided with a door 54 that selectively closes an upper portion of the corresponding passage 52. Each door 54 is hinged at a rear thereof to its corresponding rear fender 50 and associated portion of the frame 12 and is selectively connected at a front thereof to its corresponding front fender 46 via a releasable latch (not shown). The doors 54 could be configured differently in other embodiments.

The rear fenders 50 define a cargo space 56 therebetween behind the seats 24, 26. The cargo space 56 has a floor 58 extending horizontally between the rear fenders 50. The floor 58 has a plurality of apertures (not shown) such that the floor 58 can act as an attachments base to receive anchors in order to secure various items in the cargo space 56. It is contemplated that the floor 58 could be replaced by a cargo box that can be tilted in order to dump its content. A separation panel 60 extends laterally and is disposed longitudinally between the seats 24, 26 and the floor 58. As a result, the separation panel 60 separates the cockpit area 22 from the cargo area 56. Rear panels 62 are disposed laterally between the rear wheels 18 behind the floor 58.

The engine 30 will now be described in greater detail with reference to FIG. 3. The engine 30 has a crankshaft (not shown) which rotates about a crankshaft axis 112. The crankshaft extends laterally from the engine 30 to operatively connect, via the CVT 32, to the wheels 14, 18 which are driven by the engine 30. The engine 30 has a crankcase 114, a cylinder block 115 disposed on and connected to the crankcase 114, a cylinder head 116 disposed on and connected to the cylinder block 115 and a valve cover 118 disposed on and connected to the cylinder head 116. The crankshaft is housed in the crankcase 114.

The cylinder block 115 defines three cylinders (not shown) in the cylinder block 115. Each cylinder defines a cylinder axis 120a. A piston (not shown) is disposed inside each cylinder for reciprocal movement therein along the cylinder axis 120a. The lower end of each piston is linked by a connecting rod (not shown) to the crankshaft. A combustion chamber is defined in the upper portion of each cylinder by the upper portion of the walls of the respective cylinder, the cylinder head 116 and the top of the corresponding piston. In the illustrated implementation of the engine 30, each cylinder has an intake passage (not shown) defined in the right side wall of the cylinder head 116 for receiving air and fuel. A spark plug 122 is provided for each cylinder to ignite the air-fuel mixture in each cylinder. Each spark plug 122 is mounted to the cylinder head 116 and can be seen protruding out of the valve cover 118. Explosions caused by the combustion of the air-fuel mixture inside the combustion chambers of the cylinders cause the pistons to reciprocate inside the cylinders. The reciprocal movement of the pistons causes the crankshaft to rotate, thereby allowing power to be transmitted from the crankshaft to the wheels 14, 18.

As can be seen, the cylinders are arranged in an inline configuration such that the cylinder axes 120*a* of the three cylinders define a cylinder plane extending generally vertically and laterally. The crankshaft axis 112 of the crankshaft is contained in the cylinder plane. It is also contemplated that the engine 30 could have more than three cylinders or fewer than three cylinders. In general, the cylinder plane is defined as a plane containing the respective cylinder axes 120*a* of the cylinders and containing the crankshaft axis 112.

As mentioned above, the engine assembly 125 includes an air intake manifold 200 for providing air to the engine 30. With reference to FIG. 3, the air intake manifold 200 defines a plenum chamber 210 therein. Three fuel injectors 126 are mounted to the air intake manifold 200. Each fuel injector 126 delivers air to a corresponding one of the three cylinders via a corresponding runner of the air intake manifold 200. The fuel injectors 126 receive fuel from a fuel tank (not shown) via a fuel rail 128. It is contemplated that the fuel injectors 126 could be mounted to the cylinder head 116 and/or the valve cover 118 instead of the intake manifold 200 for directing fuel to the cylinders directly instead of through the runners.

The air intake manifold 200 also includes an air intake conduit 216 for delivering air to the plenum chamber 210. As shown in FIG. 3, the air intake conduit 216 is fluidly connected to a throttle body 117. The throttle body 117 includes a throttle valve 119 (shown schematically in FIG. 7) which regulates air flow into the engine 30. The throttle valve 119 is operatively connected, via a throttle valve actuator 121 (FIG. 3), to the throttle operator 129 of the vehicle 10 such that the driver's input at the throttle operator 129 causes actuation of the throttle valve 119. The plenum chamber 210 provides a large volume for equilibrating air pressure before air enters the cylinders of the engine 30 for combustion therein.

The exhaust gases resulting from the combustion of the air-fuel mixture in the combustion chambers are removed from the engine 30 via an exhaust system 135 and then released to the atmosphere and/or redirected to the turbocharger 150.

Figure 3:
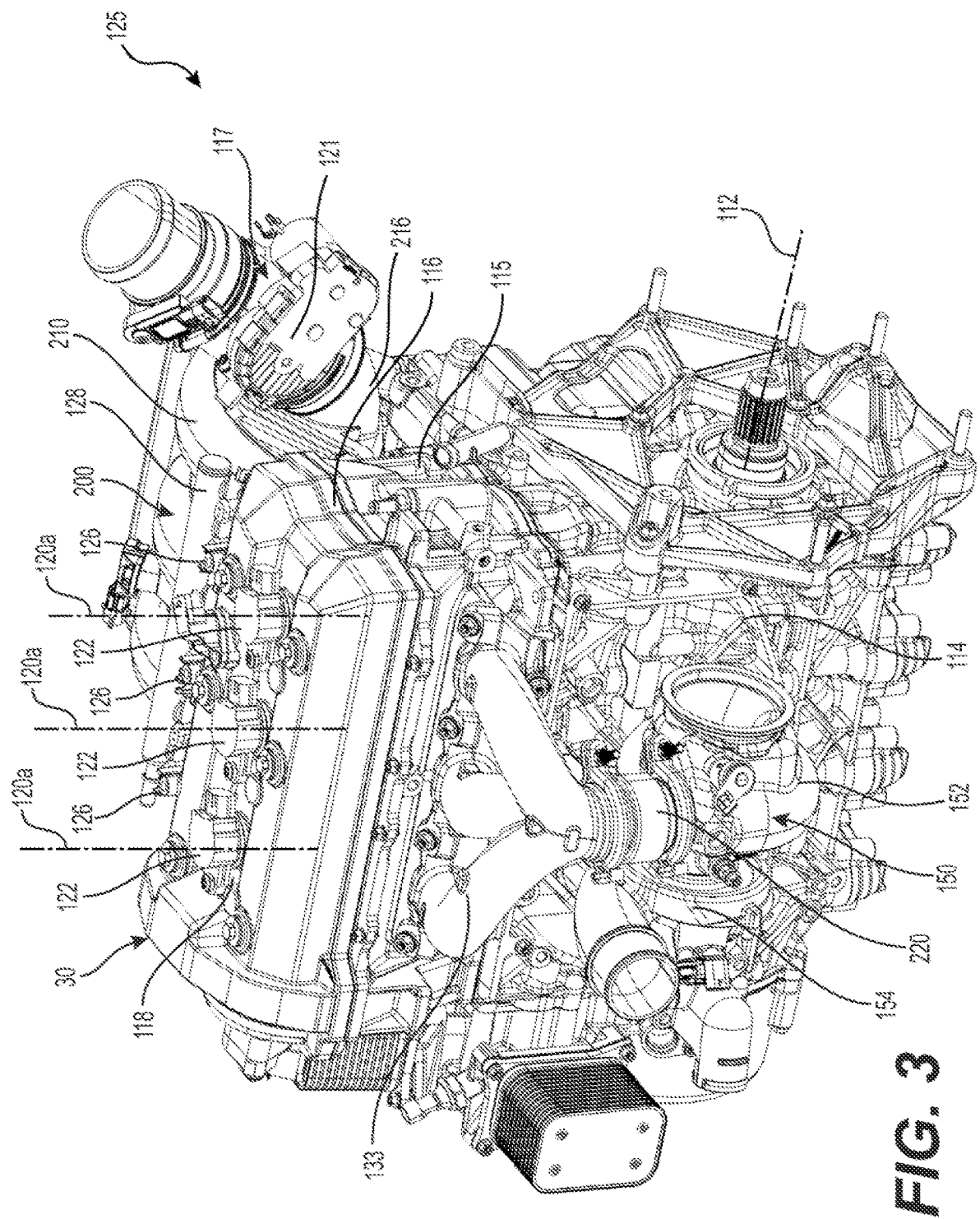
FIG. 3 is a perspective view of an engine assembly of the vehicle of FIG. 1.
Figure 4:
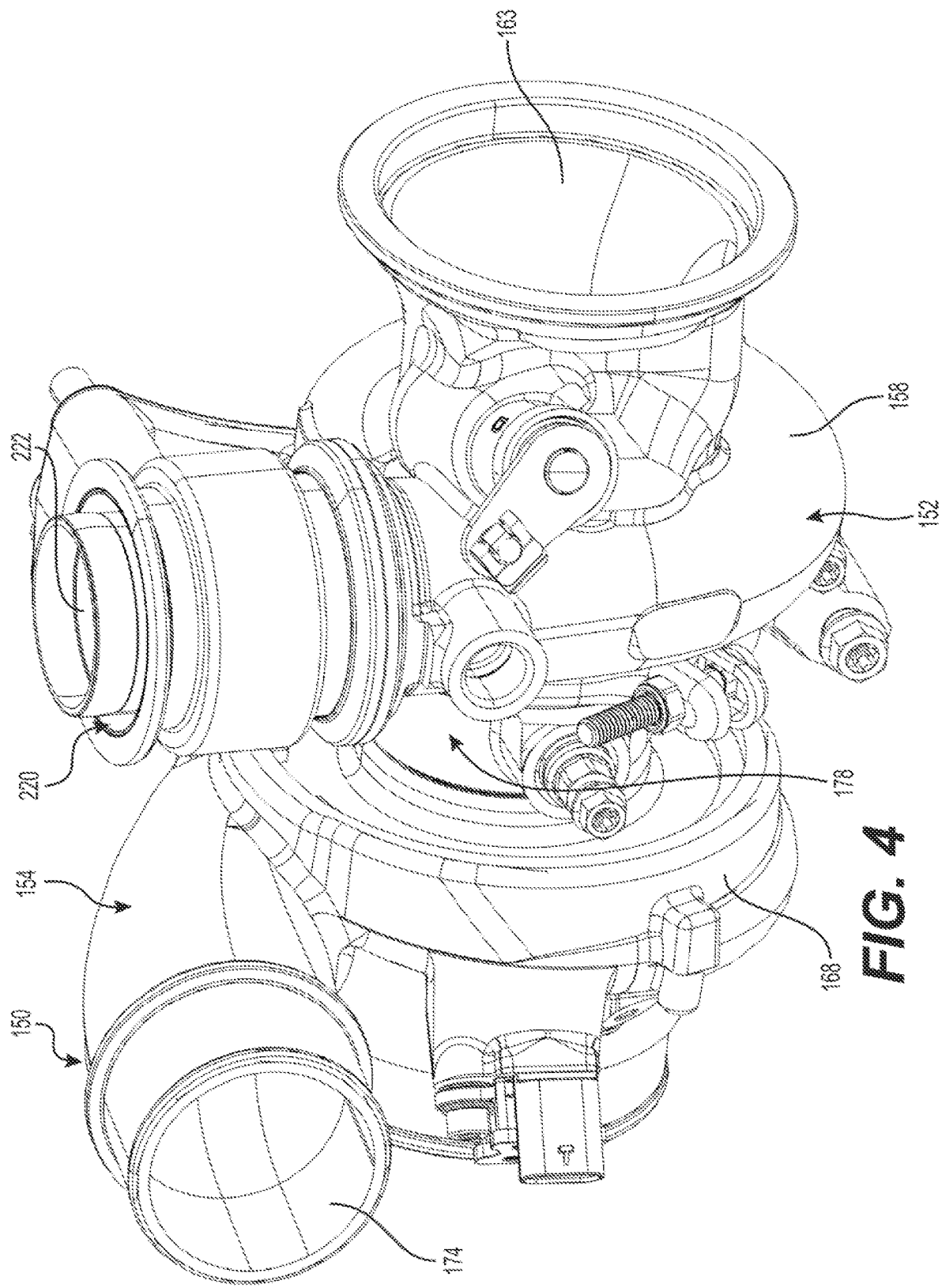
FIG. 4 is a perspective view of a turbocharger of the engine assembly of FIG. 3.

The turbocharger 150, which is schematically illustrated in FIG. 3, is provided to feed air into the cylinders of the engine 30 in order to improve the efficiency and power output of the engine 30. The turbocharger 150 is in fluid communication with respective intake and exhaust ports of the cylinders of the engine 30 so as to receive exhaust gases from the engine 30 via an exhaust manifold (not shown) and to route air into the cylinders via the intake ports. As shown in FIG. 4, the turbocharger 150 includes a turbine 152 and a compressor 154 which are rotatably linked to one another via a shaft 156 (FIG. 5) defining an axial direction of the turbocharger 150.

Figure 5:
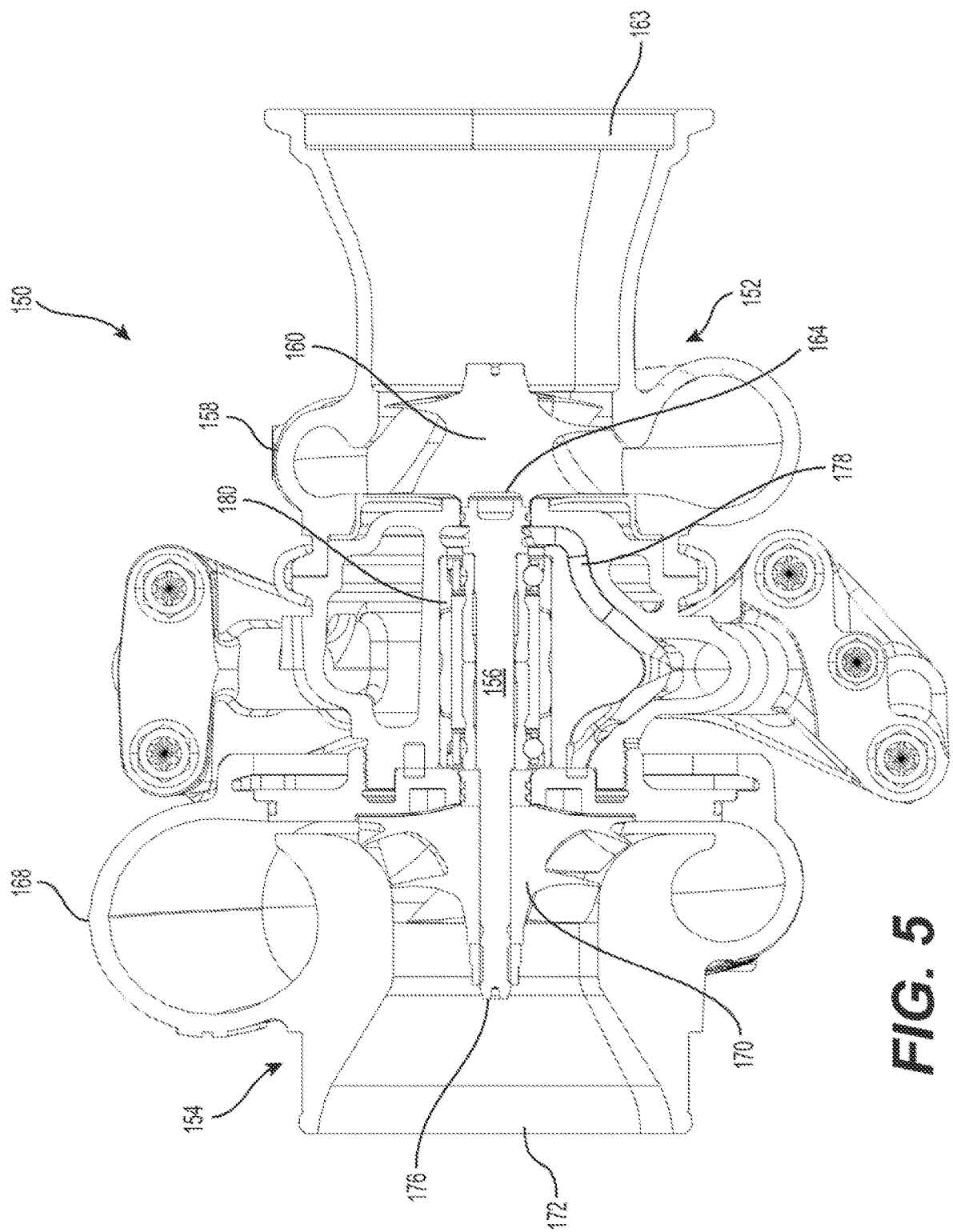
FIG. 5 is a cross-sectional view of the turbocharger of FIG. 4.

As shown in FIG. 5, the turbine 152 of the turbocharger 150 includes a turbine housing 158 and a turbine wheel 160 housed within the turbine housing 158. The turbine housing 158 is fluidly connected to the exhaust ports of the cylinders via the exhaust manifold and exhaust pipe to receive the exhaust gases discharged therefrom. To that end, the turbine housing 158 defines an inlet 159 (schematically shown in FIG. 6) in fluid communication with the exhaust ports of the engine's cylinders (through an exhaust manifold 133) for exhaust gases discharged by the engine 30 to enter the turbine housing 158. The turbine housing 158 also defines an outlet 163 for expelling the exhaust gases therefrom. The outlet 163 is in fluid communication with the exhaust system 135 of the engine 30. The turbine wheel 160 is mounted to an end 164 of the shaft 156 of the turbocharger 150 for rotation therewith and is driven by the exhaust gases received in the turbine housing 158 through its inlet. In use, the exhaust gases that enter the turbine housing 158 cause the turbine wheel 160, and thus the shaft 156 to which the turbine wheel 160 is mounted, to rotate about an axis of the shaft 156.

With continued reference to FIG. 5, the compressor 154 includes a compressor housing 168 and a compressor wheel 170 housed within the compressor housing 168. The compressor housing 168 defines an inlet 172 through which ambient air enters the compressor housing 168. The compressor housing 168 also defines an outlet 174 (FIG. 4) in fluid communication with the intake ports of the cylinders. The compressor wheel 170 is mounted to a second end 176 of the shaft 156 for rotation therewith and is driven by rotation of the shaft 156. Thus, during operation of the turbocharger 150, the compressor wheel 170 rotates together with the shaft 156 which causes air to be drawn into the compressor housing 168 through the inlet 172. The air is compressed and then expelled through the outlet 174 toward the intake ports of the cylinders.

A bearing housing 178 is disposed between the turbine housing 158 and the compressor housing 168. A bearing 180 is enclosed within the bearing housing 178 and receives part of the shaft 156 so as to allow rotation of the shaft 156 relative to the bearing housing 178.

As mentioned above, the turbine housing 158 of the turbocharger 150 is in fluid communication with the exhaust system 135 of engine assembly 125 so as to receive the exhaust gas discharged by the engine 30. The exhaust system 135 will now be described with reference to FIG. 6.

Figure 6:
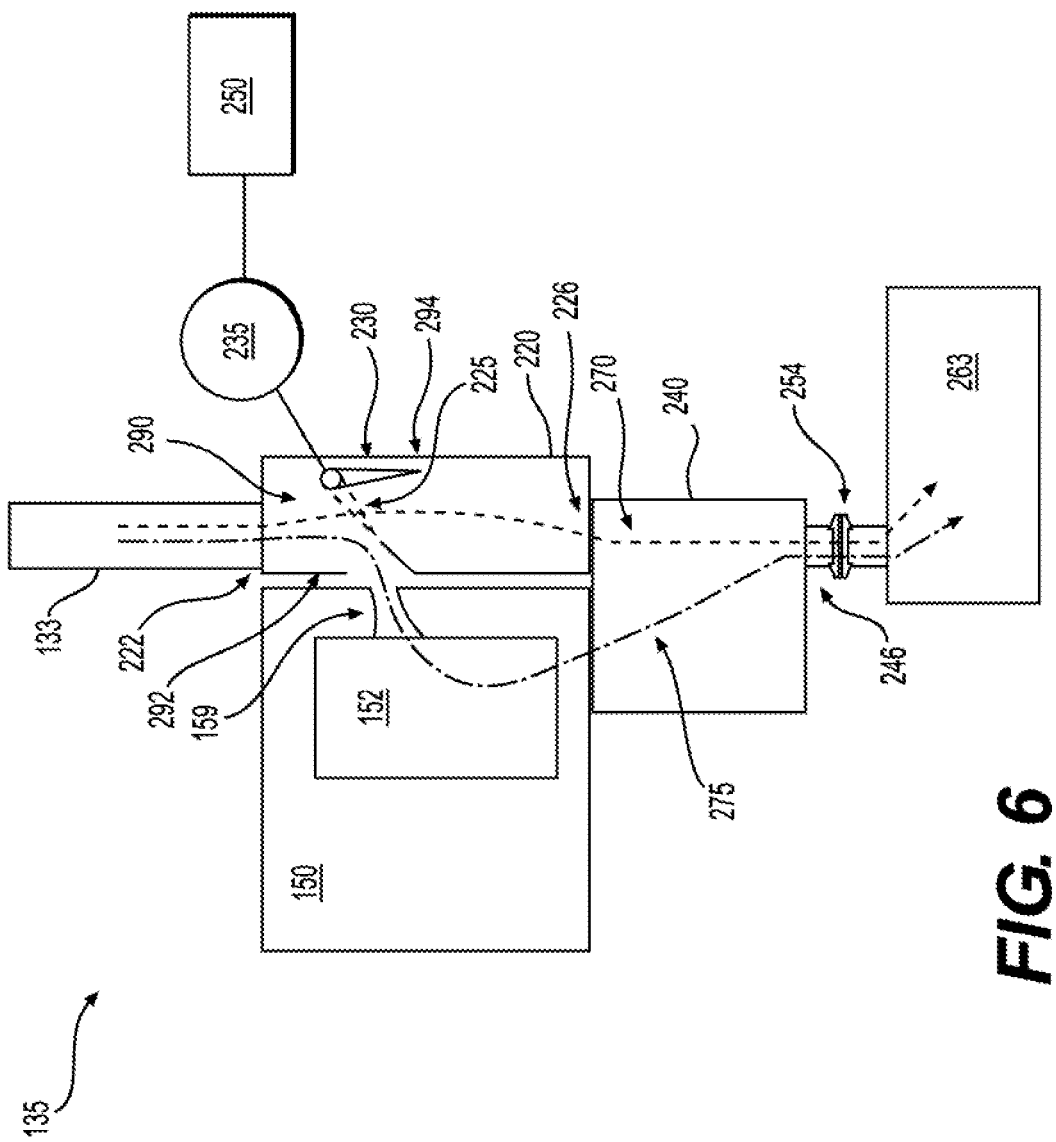
FIG. 6 is a schematic representation of an exhaust system of the vehicle of FIG. 1.

As shown in FIG. 3, the exhaust system 135 includes an exhaust manifold 133 fluidly connected to the exhaust outlets of the cylinders of the engine 30, and a conduit 220 fluidly connected between the exhaust manifold 133 and the turbocharger 150. As shown in FIG. 6, the conduit 220 directs the flow of the exhaust gas (from the exhaust manifold 133) to either bypass the turbocharger 150 or to pass through the exhaust turbine 152 of the turbocharger 150 to operate the air compressor 154. In this embodiment, the conduit 220 is fastened to the turbine housing 158 by a clamp. It is contemplated that, in other embodiments, the conduit 220 could be integrally formed with the turbine housing 158 of the turbocharger 150.

With reference to FIG. 6, the conduit 220 is generally Y-shaped, having an inlet conduit portion 290 extending from an inlet 222 of the conduit 220 (see FIG. 4) and branching into two outlet conduit portions 292, 294. The turbine outlet portion 292 of the conduit 220 (one branch of the Y-shape) fluidly communicates with the inlet 159 of the turbine housing 158. A bypass outlet portion 294 (the other branch of the Y-shape) allows exhaust gas to bypass the turbocharger 150 to exit the bypass conduit 220 through a bypass outlet 226. The bypass outlet portion 294 defines a passage 225 which allows for fluid communication between the inlet 222 of the conduit 220 and the bypass outlet 226. As such, the conduit 220 serves to selectively direct the exhaust gas which enters through the inlet 222 either into the turbine 152 or bypassing the turbine 152.

As shown in FIG. 6, flow of the exhaust gas through the passage 225 is selectively controlled by a valve 230 disposed in the conduit 220, in conjunction with a controller 250 controlling the valve 230. In this embodiment, the valve 230 is disposed in the passage 225, at a valve seat thereof. It is contemplated that the valve 230 could be disposed elsewhere in the conduit 220, for example nearer the inlet 222 and just upstream from the passage 225, depending on the specific implementation of the valve 230. It is also contemplated that in some embodiments, the valve 230 could selectively open or close the turbine outlet portion 292 rather than the bypass passage 225.

Figure 7:
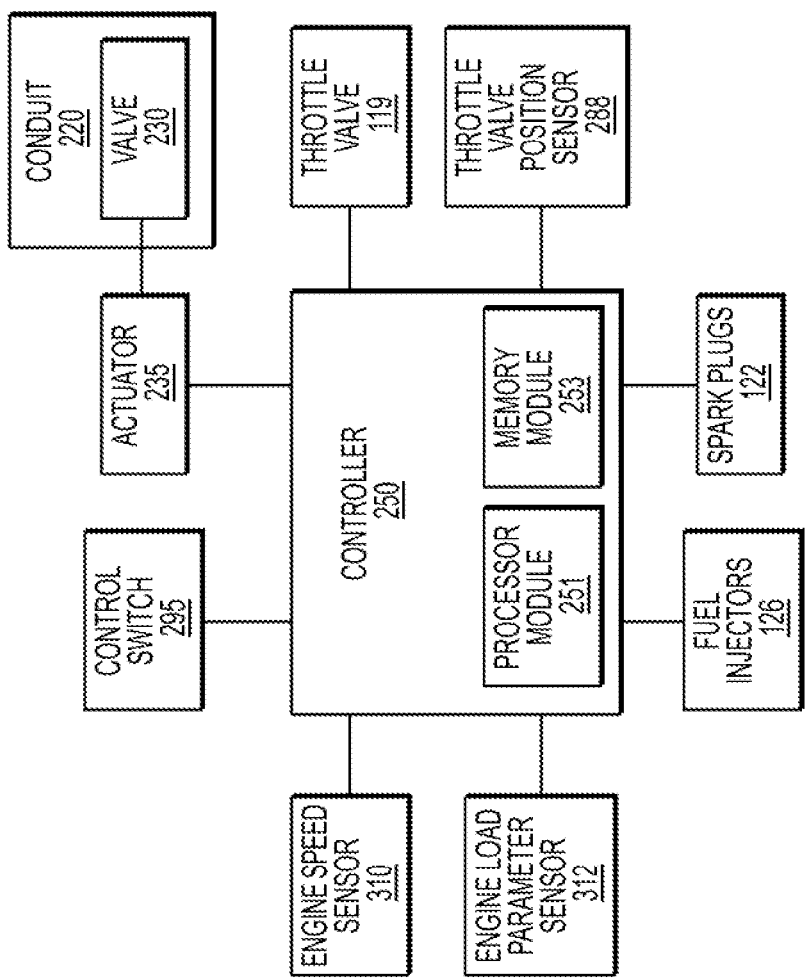
FIG. 7 is a block diagram of a control system associated with the operation of the engine assembly of FIG. 3.

As shown in FIG. 7, the controller 250 has a processor module 251 for carrying out executable code, and a non-transitory memory module 253 that stores the executable code in a non-transitory medium (not shown) included in the memory module 253. The processor module 251 includes one or more processors for performing processing operations that implement functionality of the engine controller 250. The processor module 251 may be a general-purpose processor or may be a specific-purpose processor comprising one or more preprogrammed hardware or firmware elements (e.g., application-specific integrated circuits (ASICs), electrically erasable programmable read-only memories (EEPROMs), etc.) or other related elements. The non-transitory medium of the memory module 253 may be a semiconductor memory (e.g., read-only memory (ROM) and/or random-access memory (RAM)), a magnetic storage medium, an optical storage medium, and/or any other suitable type of memory. While the controller 250 is represented as being one entity in this implementation, it is understood that the controller 250 could comprise separate entities for controlling components separately.

As schematically shown in FIG. 6, an actuator 235 in communication with the controller 250 is operatively connected to the valve 230 to cause the valve 230 to pivot about a valve pivot axis. In this embodiment, the actuator 235 is a servomotor. It is contemplated that any other suitable type of actuator may be used in other implementations. The actuator 235 is connected to the valve 230 via a linkage assembly (not shown). Notably, the actuator 235 actuates the linkage assembly to pivot the valve 230 between an open position, a closed position, and intermediate positions. It is contemplated that, in some implementations, the valve 230 could rotate, translate, or be moved otherwise to control exhaust gas flow through the passage 225.

As will be understood, the valve 230 is controlled to regulate the flow of exhaust gas through the turbocharger 150 by selectively blocking or opening access to the passage 225. Notably, a valve opening defined by the valve seat is shaped such that it corresponds to the shape of the valve 230. The valve 230 is pivotably mounted at the valve seat and is selectively movable between: an open position in which exhaust gas flow through the passage 225 is substantially unimpeded by the valve 230 (illustrated in solid lines in FIG. 6); a closed position in which the valve 230 fully closes the valve opening such that exhaust gas flow through the passage 225 is cut-off by the valve 230 (illustrated in dashed lines in FIG. 6); and any number of intermediate positions between the open and closed positions.

The controller 250 is operatively connected to an engine control unit (or ECU) and/or the electrical system (not shown) of the vehicle 10. The engine control unit is in turn operatively connected to the engine 30. The actuator 235 is communicatively connected to the controller 250 such that the position of the valve 230 is controllable thereby. It is contemplated that the valve 230 could be differently controlled or moved, depending on the implementation.

The position of the valve 230 is controlled by the controller 250 based on different inputs. For instance, in this embodiment, the valve 230 is selectively moved based on the throttle valve position determined by a throttle valve position sensor 288 in communication with the controller 250 (see FIG. 7). The throttle valve position sensor 288 senses the position of the throttle valve 119 disposed in the throttle body 117. In some modes of operation of the exhaust system 135, the valve 230 is selectively moved based on the rate of change of the throttle valve position or the rate of opening of the throttle valve 119, as determined by the throttle valve position sensor 288.

Returning now to FIG. 6, an exhaust collector 240 is fluidly connected to the conduit 220 and the turbocharger 150 so as to receive exhaust gas from both the conduit 220 and the exhaust turbine 152. More specifically, the inlet of the exhaust collector 240 receives exhaust gas that bypasses the exhaust turbine 152 and exits through the outlet 226 of the conduit 220, as well as exhaust gas that has passed through the exhaust turbine 152 from the outlet 163 of the turbine housing 158. The exhaust collector 240 also includes an outlet 246 through which exhaust gas exits the exhaust collector 240.

A muffler 263 having a muffler inlet 254 is fluidly connected to the exhaust collector 240 so as to receive exhaust gas therefrom. In particular, the muffler 263 is fluidly connected to the outlet 246 of the exhaust collector 240.

Through the configuration of the exhaust system 135, depending on the position of the valve 230, the exhaust gas can flow along a bypass exhaust flow path 270, a turbine exhaust flow path 275, or a combination of the two paths 270, 275.

Exhaust gas flowing along the bypass exhaust flow path 270 passes through the passage 225, which is not blocked by the valve 230 when the valve 230 is in the open position. The bypass exhaust flow path 270 is defined from the exhaust inlet 222 of the conduit 220 to the exhaust collector 240. Exhaust gas flowing along the bypass exhaust flow path 270 passes through the exhaust inlet 222, then through the bypass conduit 220, and then into the exhaust collector 240.

The turbine exhaust flow path 275 is similarly defined from the inlet 222 of the conduit 220 to the exhaust collector 240. Exhaust gas flowing along the second exhaust flow path passes through the inlet 222, then through the turbine outlet portion 292 of the bypass conduit 220, then through the exhaust turbine 152, and then into the exhaust collector 240.

For each flow path 270, 275, exhaust gas passes out of the outlet of the exhaust collector 240 and into the muffler inlet 254.

As will be understood, control of the valve 230 by the controller 250 affects the amount of exhaust gas discharged to the exhaust turbine 152 and therefore the performance of the turbocharger 150. Notably, a greater amount of exhaust gas discharged to the exhaust turbine 152 increases the compression of air by the compressor 154, thereby increasing the performance of the turbocharger 150. As will be explained in greater detail below, the controller 250 also controls other operational conditions associated with the engine 30 to affect the performance of the turbocharger 150.

In particular, the controller 250 is configured to, based on performance parameters associated with the vehicle 10, execute a pre-acceleration control sequence to increase the performance of the turbocharger 150 when the engine 30 is operating at a relatively low load (e.g., when the power output demand from the driver of the vehicle 10 is low). For instance, the pre-acceleration control sequence aims to, in part, increase the enthalpy of the exhaust gas discharged by the engine 30 to the exhaust turbine 152 of the turbocharger 150. As will be described, this is achieved in part at the expense of the efficiency of the engine 30 while still maintaining the power output thereof. By emphasizing performance of the turbocharger 150 when the engine 30 is operating at a low load, the spool up time of the turbocharger 150 is reduced once the driver demands greater acceleration from the engine 30. In other words, by the implementation of the pre-acceleration control sequence, the controller 250 predicts the moment when the driver will demand greater acceleration from the engine 30 and prepares the turbocharger 150 to be ready to meet that demand quickly. As such, the pre-acceleration control sequence can reduce what is known as "turbo lag", which is a delay in the response of a turbocharged engine after the throttle operator of the vehicle has been moved to operate the throttle system.

The controller 250 executes the pre-acceleration control sequence when the controller 250 operates in a pre-acceleration performance mode that, in this embodiment, is selectively and automatically activated. For instance, in this embodiment, the pre-acceleration control sequence is executed when the throttle valve 119 is open below a predetermined threshold level. In this example, the predetermined threshold level is 10% such that, when the throttle valve 119 is below 10% open, the pre-acceleration performance mode is activated and the pre-acceleration control sequence is executed by controller 250. As such, the controller 250 automatically executes the pre-acceleration control sequence without intervention from the driver of the vehicle 10. Nevertheless, it is contemplated that, in other embodiments, the pre-acceleration performance mode could be selectively activated by the driver of the vehicle 10. For instance, the controller 250 could be in communication with a control switch 295 (FIG. 7) that is selectively operable by the driver to activate and deactivate the pre-acceleration performance mode.

The performance parameters associated with the vehicle 10 on which the controller 250 bases the execution of the pre-acceleration control sequence include a speed of the engine 30 and a load demand parameter of the engine 30 (i.e., a parameter of the engine 30 associated with a load demanded from the engine 30). The load demand parameter of the engine 30 varies as a function of the speed of the engine 30. In this embodiment, as shown in FIG. 7, the controller 250 detects the speed of the engine 30 and the load demand parameter of the engine 30 via an engine speed sensor 310 and an engine load parameter sensor 312 that are in communication with the controller 250. It is contemplated that the speed of the engine 30 may be determined otherwise.

In this embodiment, the load demand parameter of the engine 30 is a torque of the engine 30 which is a function of the speed of the engine 30. Thus, in this embodiment, the engine load parameter sensor 312 is a torque sensor. It is contemplated that other load demand parameters of the engine 30 may be used instead of the torque of the engine 30 such as, for example, a break mean effective pressure (BMEP) which is the average pressure acting on the top of the pistons during the power stroke of the engine 30. In some embodiments, the load demand parameter of the engine 30 may be a position of the throttle valve 119 or a position of the throttle operator 129 of the vehicle 10 which, as mentioned above, is operatively connected to the throttle valve 119. In such embodiments, the load demand parameter of the engine 30 may simply be determined based on the signals transmitted to the controller 250 by the throttle valve position sensor 288.

Figure 9:
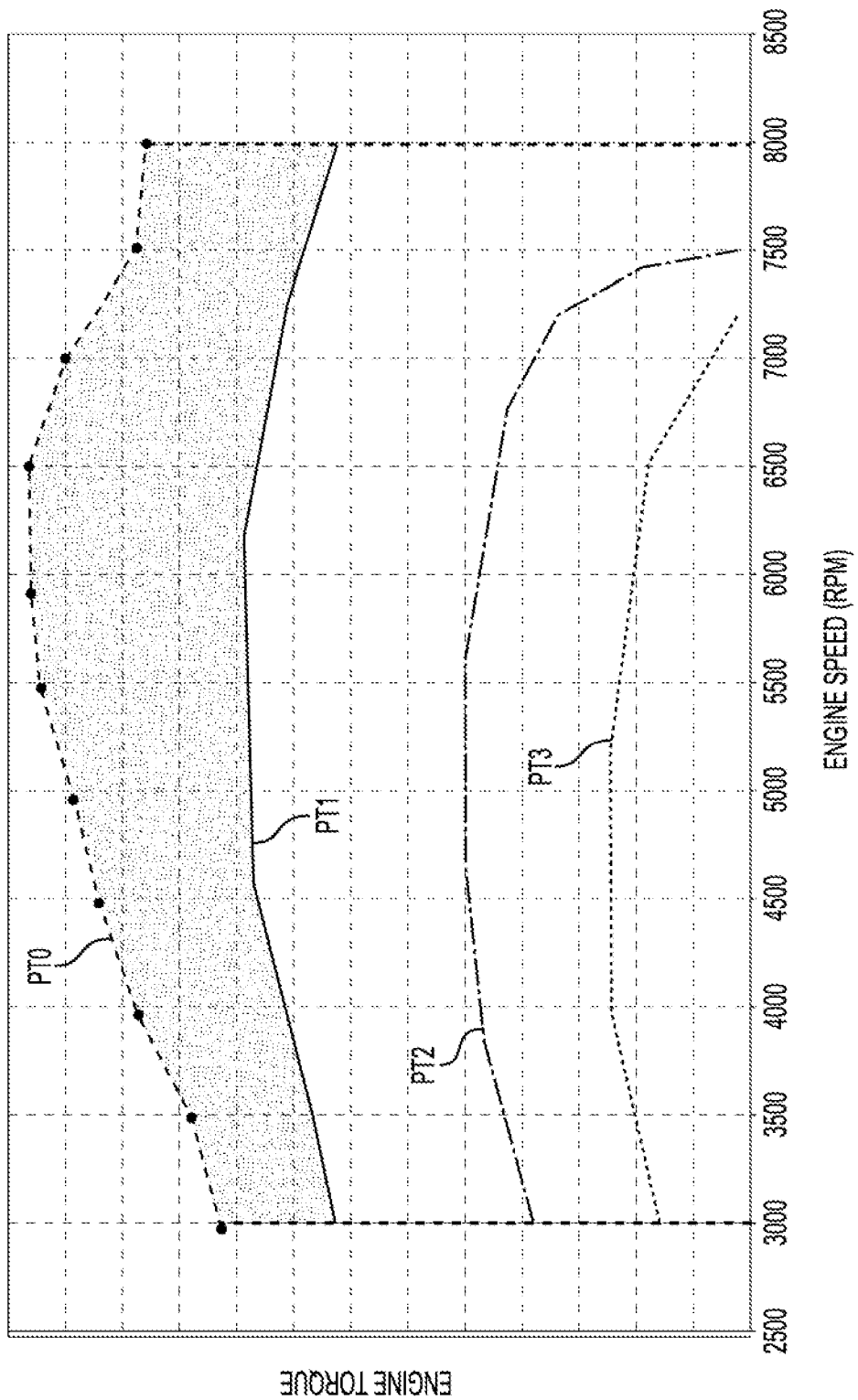
FIG. 9 is a graph illustrating various predetermined engine load demand thresholds used to execute the pre-acceleration control sequence of FIG. 8.

FIG. 9 illustrates different torque thresholds at which different steps of the pre-acceleration control sequence are executed, as will be described in greater detail below. As can be seen, the different torque thresholds of the engine 30 vary as a function of the speed of the engine 30. As mentioned above, it is contemplated that any other parameter related to the load demand of the engine 30 that varies as function of the speed of the engine 30 could alternatively be used instead of the torque of the engine 30. Notably, the BMEP associated with the engine 30 could be used instead of the torque of the engine 30. Other parameters associated with the load demand of the engine 30 are also contemplated.

The pre-acceleration control sequence executed by the controller 250 will now be described in detail with reference to FIG. 8.

At step 1005 of the pre-acceleration control sequence, the controller 250 controls the valve 230, via the actuator 235, so as to direct a majority of exhaust gas discharged by the engine 30 through the turbocharger portion 292 of the conduit 220 and through the exhaust turbine 152 of the turbocharger 150. In other words, the controller 250 controls the valve 230 so that the majority of exhaust gas discharged by the engine 30 takes the flow path 275, as illustrated in FIG. 6. As mentioned above, routing additional exhaust gas through the exhaust turbine 152 increases the performance of the turbocharger 150.

It is to be understood that, in some embodiments, such as when the exhaust system 135 of the engine assembly 125 does not include a valve such as the valve 230, then the step 1005 can be omitted from the pre-acceleration control sequence.

With reference to FIG. 9, the step 1005 is executed when the load demand parameter of the engine 30 that is monitored by the controller 250 is less than a predetermined engine load demand threshold PT0 for the speed of the engine 30 at which the engine 30 is operating. More specifically, since in this embodiment the load demand parameter of the engine 30 that is monitored to execute the pre-acceleration control sequence is the torque of the engine 30, the predetermined engine load demand threshold PT0 is a predetermined engine torque threshold PT0. Therefore, if, for a given speed of the engine 30 (e.g., 3000 rpm), the torque of the engine 30 is less than the predetermined torque threshold PT0 for that given engine speed, the valve 230 is actuated so as to direct a majority of exhaust gas discharged by the engine 30 through the exhaust turbine 152 of the turbocharger 150.

Returning to FIG. 8, at step 1010 of the pre-acceleration control sequence, ignition within the cylinders of the engine 30 by the spark plugs 122 is delayed. That is, the controller 250 controls the spark plugs 122 so as to delay the moment at which the spark plugs 122 ignite the air-fuel mixture within the cylinders of the engine 30. The delayed ignition within the cylinders causes the temperature of the exhaust gas discharged by the engine 30 to the exhaust turbine 152 of the turbocharger 150 to increase, thereby increasing the enthalpy of the exhaust gas entering the turbocharger 150. In turn, this increases the performance of the turbocharger 150. At the same time, the delayed ignition within the cylinders of the engine 30 reduces the torque produced by the engine 30.

With reference to FIG. 9, the step 1010 is executed when the load demand parameter of the engine 30 is less than a predetermined engine load demand threshold PT1 for the speed of the engine 30 at which the engine 30 is operating (i.e., when the torque of the engine 30 is less than the predetermined torque threshold PT1). In other words, when the torque of the engine 30 is less than the predetermined torque threshold PT1, the ignition within the cylinders of the engine 30 by the spark plugs 122 is delayed relative to the ignition timing during normal operation of the engine 30 (i.e., not in the pre-acceleration control sequence). As can be seen in FIG. 9, the predetermined engine load demand threshold PT1 is lower than the first predetermined engine load demand threshold PT0 for any given speed of the engine 30. Therefore, in this embodiment, in a scenario whereby the power output of the engine 30 lowers due to decreased torque demand from the driver of the vehicle 10, the step 1005 (which is executed below the predetermined engine load demand threshold PT0) is executed before the step 1010.

As shown in FIG. 8, next, at step 1020, one or more of the cylinders of the engine 30 is deactivated per rotation of the crankshaft of the engine 30 in a predetermined pattern so as to reduce the torque of the engine 30. In this embodiment, the cylinders are deactivated by disabling the fuel injectors 126 corresponding to the cylinders selected for deactivation. Nevertheless, it is contemplated that, instead of deactivating the selected cylinders by disabling the corresponding fuel injectors 126, the controller 250 could instead deactivate the selected cylinders by disabling the corresponding spark plugs 122. When a given one of the cylinders is deactivated, air flow through that cylinder is maintained.

With reference to FIG. 9, the step 1020 is executed when the load demand parameter of the engine 30 is less than a predetermined engine load demand threshold PT2 for the speed of the engine 30 at which the engine 30 is operating (i.e., when the torque of the engine 30 is less than the predetermined torque threshold PT2). In other words, when the torque of the engine 30 is less than the predetermined torque threshold PT2, one or more of the cylinders of the engine 30 are deactivated in the predetermined pattern. As can be seen in FIG. 9, the predetermined engine load demand threshold PT2 is lower than the first predetermined engine load demand threshold PT1 for any given speed of the engine 30.

In this embodiment, when the load demand parameter of the engine 30 is sufficiently small for a given operating speed of the engine 30, an additional cylinder of the engine 30 is deactivated for at least one rotation of the crankshaft of the engine 30. That is, in addition to the cylinder that is deactivated for at least one rotation of the crankshaft of the engine 30 in the predetermined pattern, another cylinder is deactivated for at least one rotation of the crankshaft of the engine 30 so that, for at least one rotation of the crankshaft, two cylinders are deactivated. More specifically, the additional cylinder is deactivated for at least one rotation of the crankshaft of the engine 30 when the load demand parameter of the engine 30 is less than a predetermined engine load demand threshold PT3 for the speed of the engine 30 at which the engine 30 is operating (i.e., when the torque of the engine 30 is less than the predetermined torque demand threshold PT3). As can be seen in FIG. 9, the predetermined engine load demand threshold PT3 is lower than the predetermined engine load demand threshold PT2 for any given speed of the engine 30. By deactivating an additional cylinder for at least one rotation of the crankshaft, the boost pressure generated by the turbocharger 150 can be maintained even when the throttle operator 129 is released momentarily by the driver.

The predetermined pattern in which the selected cylinders are deactivated establishes which cylinders are deactivated in consecutive rotations of the crankshaft of the engine 30. In this embodiment, the deactivated cylinder includes a different cylinder for each consecutive rotation of the crankshaft. For instance, in this embodiment, the predetermined pattern includes alternatingly deactivating a different one of the three cylinders for three consecutive rotations of the crankshaft (i.e., for a number of rotations of the crankshaft equal to the number of cylinders of the engine 30) and then activating all of the cylinders for one rotation of the crankshaft. That is, a first one of the cylinders is deactivated for a first rotation of the crankshaft, a second one of the cylinders is deactivated for a second rotation of the crankshaft consecutive to the first rotation of the crankshaft, a third one of the cylinders is deactivated for a third rotation of the crankshaft consecutive to the second rotation of the crankshaft, and all three of the cylinders are activated for a fourth rotation of the crankshaft consecutive to the third rotation of the crankshaft.

Generally, in the predetermined patterns of deactivation of the cylinders, at least one of the deactivated cylinders is changed for each consecutive rotation of the crankshaft of the engine so that none of the cylinders remains inactive for an excessively long time.

Other predetermined patterns of deactivation of the cylinders are also contemplated. For instance, in some embodiments, the predetermined pattern includes alternatingly deactivating two of the cylinders for three consecutive rotations of the crankshaft (i.e., for a number of rotations of the crankshaft equal to the number of cylinders of the engine 30) and then activating all of the cylinders for one rotation of the crankshaft. In yet other embodiments, the predetermined pattern includes alternatingly deactivating all of the cylinders for one rotation of the crankshaft and then activating all of the cylinders for one or more rotations of the crankshaft.

Returning now to FIG. 8, at the same time as step 1020 is executed, a step 1030 of the pre-acceleration control sequence is executed whereby the controller 250 actuates the throttle valve 119 to increase air flow to the engine 30 and thereby increase the torque of the engine 30. This compensates at least in part the reduction of the torque of the engine 30 caused by the delayed ignition within the cylinders at step 1010 and the deactivation of the cylinders at step 1020. At the same time, this increases a volume of exhaust gas discharged by the engine 30 to the exhaust turbine 152 of the turbocharger 150. Therefore, while the torque produced by the engine 30 is compromised at steps 1010 and 1020 (delaying ignition and deactivating the cylinders), step 1030 allows compensating at least in part this loss of torque output by increasing the air flow to the engine 30. Therefore, torque and power output of the engine 30 remains generally constant throughout execution of the pre-acceleration control sequence.

Similarly, at the same time as steps 1020 and 1030 are executed, a step 1040 of the pre-acceleration control sequence is executed whereby the controller 250 controls the fuel injectors 126 in order to increase the volume of fuel injected into the cylinders other than the deactivated cylinders. Similarly to step 1030, this compensates at least in part the reduction of the torque of the engine 30 caused by steps 1010, 1020 so as to maintain the torque and power output of the engine 30 generally constant throughout execution of the pre-acceleration control sequence. Moreover, the increased volume of fuel injected into the cylinders is proportional to the increased air flow caused by step 1030, thereby maintaining the air-fuel mix ratio within the cylinders to allow optimal engine operation.

As will be understood, by increasing the volume of fuel injected into the cylinders at step 1040, fuel consumption is increased. Therefore, although the torque and power output of the engine 30 remains generally constant throughout execution of the pre-acceleration control sequence as mentioned above while performance of the turbocharger 150 is increased, this comes at a cost of increased fuel consumption (i.e., decreased fuel efficiency). Although this may not be desirable in consumer vehicles such as cars used in an urban environment, the resulting improved acceleration response time can nevertheless be desirable in SSVs such as the vehicle 10 and other similar vehicles.

Thus, in use, the pre-acceleration control sequence is executed when the load of the engine 30 is relatively low. Once the driver of the vehicle 10 actuates the throttle operator 129 to demand torque from the engine 30, the steps of the pre-acceleration control sequence are reversed, notably activating all of the cylinders of the engine 30 and advancing the ignition timing within the cylinders. These two steps can particularly be quickly done since controlling the spark plugs 122 and the fuel injectors 126 is considerably faster than changing mass flow to the engine 30.

Figure 10:
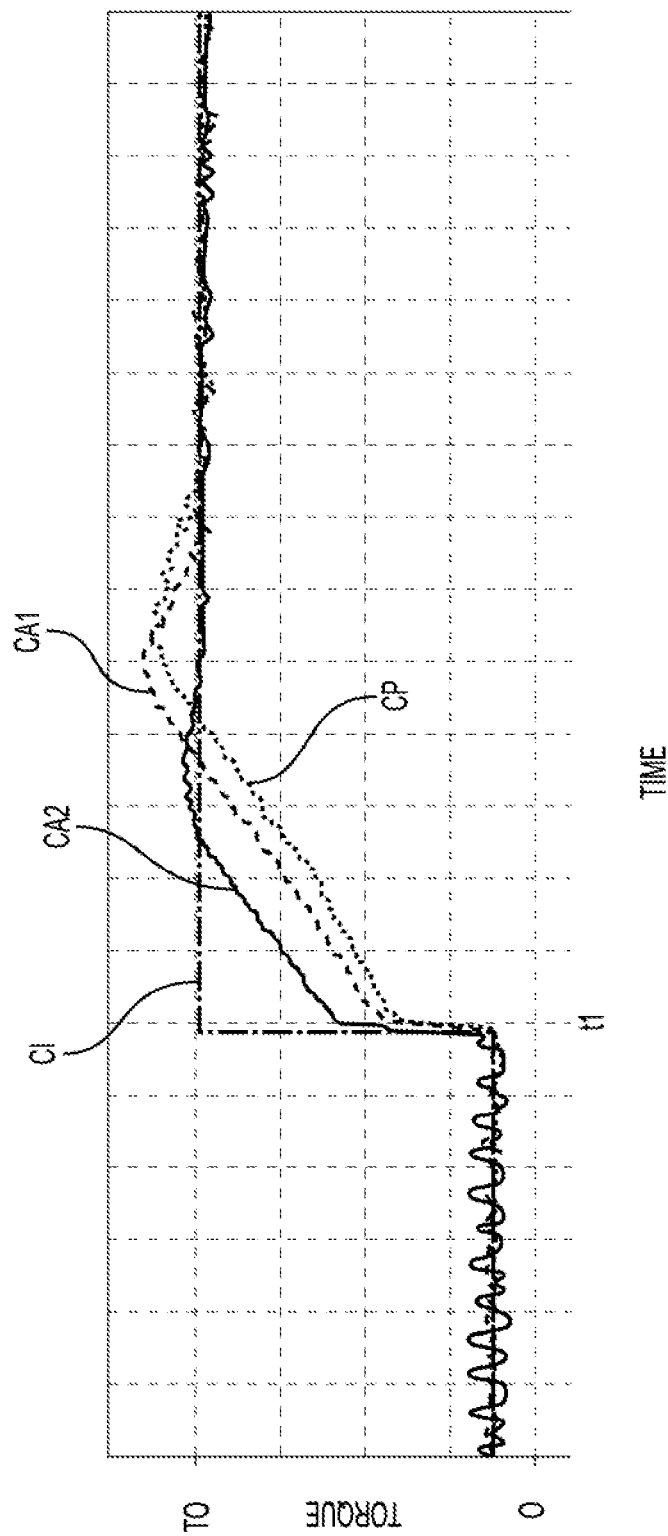
FIG. 10 is a graph illustration various response curves of engine torque as a function of time.

By implementing the pre-acceleration control sequence described above, the present technology is able to increase the performance of the turbocharger 150 when the engine 30 is operating at a relatively low load. As a result, when the driver demands greater power output from the engine 30 (i.e., acceleration) via the throttle operator 129 of the vehicle 10, the response time for the engine 30 to reach the desired power output is shortened when compared to if the vehicle 10 were not to implement the pre-acceleration control sequence. For instance, FIG. 10 shows different torque output curves of the engine 30 for different scenarios when, at time t1, the throttle valve 119 is moved to a wide open throttle position (i.e., 100% open position allowing maximum air intake into the engine 30). The curve CI represents the ideal response of the engine 30 which would be an immediate increase to the desired torque output TO—thus the curve CI is represented as a step function. As will be understood by the reader, the desired response of the engine 30 would therefore be as close as possible to the ideal response curve CI. The curve CP represents the response of the engine 30 if the pre-acceleration control sequence were not implemented. As can be seen, under the response represented by the curve CP, the engine 30 takes a significant amount of time to reach the desired torque output TO. Moreover, the torque output of the engine 30 according to the curve CP overshoots the desired torque output TO. This is due to the fact that the turbocharger has to spool up to a given speed to generate the desired boost pressure before the valve 230 is opened to release excessive pressure. A lag time between these two actions results in the torque overshooting the desired torque output TO. The curve CA1 represents the response of the engine 30 if only steps 1010, 1030 and 1040 of the pre-acceleration control sequence were implemented (i.e., step 1020, deactivation of the cylinders, is not executed). As can be seen, the response time to reach the desired torque output TO is slightly improved over the curve CP. Moreover, the overshoot of the torque engine above the desired torque output TO is slightly reduced compared to the curve CP. Lastly, the curve CA2 represents the response of the engine 30 when the pre-acceleration control sequence is implemented. As can be seen, the response time to reach the desired torque output TO is significantly improved over the curves CA1, CP. Notably, due to the turbocharger 150 operating with increased performance during the pre-acceleration control sequence, the torque output of the engine 10 immediately following time t1 is significantly higher when the pre-acceleration control sequence has been implemented and therefore the amount of time needed to reach the desired torque output TO is much smaller than in the other two example scenarios. Furthermore, as will be appreciated, the overshoot of the torque engine above the desired torque output TO is significantly reduced compared to both curves CA1, CP. Notably, since the pre-acceleration control sequence keeps the turbocharger 150 running at high speed, the lag time for the valve 230 to release excessive pressure is minimal.

In addition to modifying the performance of the turbocharger 150 and thereby reducing the response time to reach the desired torque output of the engine 30, the execution of the pre-acceleration control sequence by the controller 250 also modifies the sound emitted by the engine assembly 125 and thus by the vehicle 10. This can be desirable to give the vehicle 10 a distinctive auditory signature that easily identifies the vehicle 10 as a sports performance vehicle.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. An engine assembly for a vehicle, comprising:
   an internal combustion engine comprising:
     a crankcase;
     a crankshaft disposed at least in part in the crankcase;
     a cylinder block connected to the crankcase;
     a plurality of cylinders defined in the cylinder block;
     a plurality of pistons operatively connected to the crankshaft, each piston of the plurality of pistons being movably disposed within a corresponding cylinder of the plurality of cylinders;
     a plurality of spark plugs connected to the plurality of cylinders, each spark plug of the plurality of spark plugs being configured to produce a spark to ignite an air-fuel mixture in a corresponding cylinder of the plurality of cylinders; and
     a plurality of fuel injectors for injecting fuel into the plurality of cylinders;
   a throttle body in fluid communication with the engine;
   a throttle valve for regulating air flowing through the throttle body into the engine;
   a turbocharger operatively connected to the engine, the turbocharger comprising a compressor and an exhaust turbine; and
   a controller operable to control the spark plugs, the fuel injectors and the throttle valve, the controller being configured to, based on at least one performance parameter associated with the vehicle, execute a pre-acceleration control sequence, the at least one performance parameter associated with the vehicle including a speed of the engine and a load demand parameter of the engine, the controller executing steps of the pre-acceleration control sequence based on at least one predetermined engine load demand threshold that varies as a function of the speed of the engine, the at least one predetermined engine load demand threshold including a first predetermined engine load demand threshold, the pre-acceleration control sequence comprising:
     in response to the load demand parameter of the engine at a given speed of the engine being less than the first predetermined engine load demand threshold for the given speed of the engine, delaying ignition within the cylinders by the spark plugs so as to increase a temperature of exhaust gas discharged by the engine to the exhaust turbine of the turbocharger and reduce a torque of the engine;

deactivating at least one cylinder of the plurality of cylinders in a predetermined pattern by disabling at least one of (i) at least one fuel injector of the plurality of fuel injectors and (ii) at least one spark plug of the plurality of spark plugs corresponding to the at least one cylinder, so as to reduce the torque of the engine;

actuating the throttle valve to increase air flow to the engine so as to (i) increase the torque of the engine thereby compensating at least in part reduction of the torque of the engine caused by delaying ignition within the cylinders and deactivating the at least one cylinder, and (ii) increase a volume of exhaust gas discharged to the exhaust turbine of the turbocharger; and increasing a volume of fuel injected by the fuel injectors into the cylinders other than the at least one cylinder so as to increase the torque of the engine thereby compensating at least in part reduction of the torque of the engine caused by delaying ignition within the cylinders and deactivating the at least one cylinder.

2. The engine assembly of claim 1, wherein the pre-acceleration control sequence is executed by the controller in response to the controller operating in a pre-acceleration performance mode that is selectively activated.

3. The engine assembly of claim 2, wherein the pre-acceleration performance mode is automatically activated.

4. The engine assembly of claim 2, wherein the pre-acceleration performance mode is activated by a user.

5. The engine assembly of claim 1, wherein the at least one cylinder deactivated by the controller includes a different cylinder of the plurality of cylinders for each consecutive rotation of the crankshaft of the engine.

6. The engine assembly of claim 1, wherein:
the at least one predetermined engine load demand threshold includes a second predetermined engine load demand threshold, the second predetermined engine load demand threshold being lower than the first predetermined engine load demand threshold for any given speed of the engine; and
in response to the load demand parameter of the engine at the given speed of the engine being less than the second predetermined engine load demand threshold for the given speed of the engine, the controller deactivates the at least one cylinder of the plurality of cylinders.

7. The engine assembly of claim 6, wherein:
the at least one predetermined engine load demand threshold includes a third predetermined engine load demand threshold, the third predetermined engine load demand threshold being lower than the second predetermined engine load demand threshold for any given speed of the engine;
the at least one cylinder of the plurality of cylinders includes a first cylinder and a second cylinder;
in response to the load demand parameter of the engine at the given speed of the engine being less than the second predetermined engine load demand threshold for the given speed of the engine, the controller deactivates the first cylinder; and
in response to the load demand parameter of the engine at the given speed of the engine being less than the third predetermined engine load demand threshold for the given speed of the engine, the controller deactivates the second cylinder.

8. The engine assembly of claim 1, wherein:
the engine assembly further comprises a conduit having a bypass portion for directing flow of exhaust gas to bypass the turbocharger and a turbocharger portion for directing flow of exhaust gas to pass through the exhaust turbine;
the conduit comprises a valve for selectively diverting exhaust gas away from the exhaust turbine, the controller being operable to control the valve;
the at least one predetermined engine load demand threshold includes a second predetermined engine load demand threshold, the second predetermined engine load demand threshold being greater than the first predetermined engine load demand threshold for any given speed of the engine; and
in response to the load demand parameter of the engine at the given speed of the engine being less than the second predetermined engine load demand threshold for the given speed of the engine, the controller controls the valve so as to direct at least a majority of exhaust gas discharged by the engine through the turbocharger portion of the conduit to pass through the exhaust turbine of the turbocharger.

9. The engine assembly of claim 1, wherein, when the controller deactivates the at least one cylinder, air flow through the at least one cylinder is maintained.

10. The engine assembly of claim 1, wherein the pre-acceleration control sequence is executed in response to the throttle valve being open below a predetermined threshold level.

11. A vehicle comprising the engine assembly of claim 1.

12. A method for controlling an internal combustion engine for a vehicle, the engine being operatively connected to a turbocharger, the engine comprising a plurality of cylinders defined in a cylinder block of the engine, the method comprising:

determining at least one performance parameter associated with the vehicle, the at least one performance parameter associated with the vehicle including a speed of the engine and a load demand parameter of the engine;

in response to the at least one performance parameter associated with the vehicle being lower than a predetermined threshold value thereof:
delaying ignition within the cylinders by a plurality of spark plugs connected to the plurality of cylinders so as to increase a temperature of exhaust gas discharged by the engine to an exhaust turbine of the turbocharger and reduce a torque of the engine, said delaying ignition within the cylinders being effected in response to the load demand parameter of the engine at a given speed of the engine being less than a first predetermined engine load demand threshold for the given speed of the engine, the first predetermined engine load demand threshold varying as a function of the speed of the engine;
deactivating at least one cylinder of the plurality of cylinders in a predetermined pattern by disabling at least one of (i) at least one fuel injector of a plurality of fuel injectors and (ii) at least one spark plug of the plurality of spark plugs corresponding to the at least one cylinder, so as to reduce the torque of the engine, said deactivating the at least one cylinder of the plurality of cylinders being effected in response to the load demand parameter of the engine for the given speed of the engine being less than a second predetermined engine load demand threshold for the given speed of the engine, the second predetermined engine load demand threshold varying as a function of the speed of the engine, the second predetermined engine load demand threshold being lower than the first predetermined engine load demand threshold for any given speed of the engine;

actuating a throttle valve disposed in a throttle body in fluid communication with the engine to increase air flow to the engine so as to (i) increase the torque of the engine thereby compensating at least in part reduction of the torque of the engine caused by delaying ignition within the cylinders and deactivating the at least one cylinder, and (ii) increase a volume of exhaust gas discharged to the exhaust turbine of the turbocharger; and increasing a volume of fuel injected by the fuel injectors into the cylinders other than the at least one cylinder so as to increase the torque of the engine thereby compensating at least in part reduction of the torque of the engine caused by delaying ignition within the cylinders and deactivating the at least one cylinder.

13. The method of claim 12, further comprising:

prior to determining the at least one performance parameter associated with the vehicle, receiving a signal representative of a request to begin a pre-acceleration control sequence.

14. The method of claim 12, wherein the at least one deactivated cylinder includes a different cylinder of the plurality of cylinders for each consecutive rotation of a crankshaft of the engine.

15. The method of claim 12, wherein:

deactivating the at least one cylinder of the plurality of cylinders in the predetermined pattern comprises:

deactivating first and second selected cylinders of the plurality of cylinders in the predetermined pattern in response to the load demand parameter of the engine at the given speed of the engine being less than a third predetermined engine load demand threshold for the given speed of the engine, the third predetermined engine load demand threshold varying as a function of the speed of the engine, the third predetermined engine load demand threshold being lower than the second predetermined engine load demand threshold for any given speed of the engine.

16. The method of claim 12, wherein:

the engine is in fluid communication with a conduit having a bypass portion for directing flow of exhaust gas to bypass the turbocharger and a turbocharger portion for directing flow of exhaust gas to pass through the exhaust turbine of the turbocharger; and the method further comprises:

controlling a valve of the conduit so as to direct at least a majority of exhaust gas discharged by the engine to pass through the exhaust turbine of the turbocharger in response to the load demand parameter of the engine at the given speed of the engine being less than a third predetermined engine load demand threshold for the given speed of the engine, the third predetermined engine load demand threshold varying as a function of the speed of the engine, the third predetermined engine load demand threshold being greater than the first predetermined engine load demand threshold for any given speed of the engine.

17. The method of claim 12, wherein deactivating the at least one cylinder comprises disabling the at least one fuel injector corresponding to the at least one cylinder.

18. A method for controlling an internal combustion engine for a vehicle, the engine being operatively connected to a turbocharger, the engine comprising a plurality of cylinders defined in a cylinder block of the engine, the engine being in fluid communication with a conduit having a bypass portion for directing flow of exhaust gas to bypass the turbocharger and a turbocharger portion for directing flow of exhaust gas to pass through an exhaust turbine of the turbocharger, the method comprising:

determining at least one performance parameter associated with the vehicle, the at least one performance parameter associated with the vehicle including a speed of the engine and a load demand parameter of the engine;

in response to the at least one performance parameter associated with the vehicle being lower than a predetermined threshold value thereof:

delaying ignition within the cylinders by a plurality of spark plugs connected to the plurality of cylinders so as to increase a temperature of exhaust gas discharged by the engine to the exhaust turbine of the turbocharger and reduce a torque of the engine, said delaying ignition within the cylinders being effected in response to the load demand parameter of the engine at a given speed of the engine being less than a first predetermined engine load demand threshold for the given speed of the engine, the first predetermined engine load demand threshold varying as a function of the speed of the engine;

deactivating at least one cylinder of the plurality of cylinders in a predetermined pattern by disabling at least one of (i) at least one fuel injector of a plurality of fuel injectors and (ii) at least one spark plug of the plurality of spark plugs corresponding to the at least one cylinder, so as to reduce the torque of the engine;

actuating a throttle valve disposed in a throttle body in fluid communication with the engine to increase air flow to the engine so as to (i) increase the torque of the engine thereby compensating at least in part reduction of the torque of the engine caused by delaying ignition within the cylinders and deactivating the at least one cylinder, and (ii) increase a volume of exhaust gas discharged to the exhaust turbine of the turbocharger;

increasing a volume of fuel injected by the fuel injectors into the cylinders other than the at least one cylinder so as to increase the torque of the engine thereby compensating at least in part reduction of the torque of the engine caused by delaying ignition within the cylinders and deactivating the at least one cylinder; and controlling a valve of the conduit so as to direct at least a majority of exhaust gas discharged by the engine to pass through the exhaust turbine of the turbocharger in response to the load demand parameter of the engine at the given speed of the engine being less than a second predetermined engine load demand threshold for the given speed of the engine, the second predetermined engine load demand threshold varying as a function of the speed of the engine, the second predetermined engine load demand threshold being greater than the first predetermined engine load demand threshold for any given speed of the engine.

* * * * *